Oct. 8, 1968   M. N. VRANCKEN   3,405,265
THERMOGRAPHIC COPYING METHOD AND APPARATUS HAVING MEANS
FOR UNIFORMLY PRE-HEATING THE COPY SHEET
Filed May 24, 1965   3 Sheets-Sheet 1

INVENTOR
MARCEL NICOLAS VRANCKEN

BY
WATSON, COLE, GRINDLE & WATSON
ATTORNEYS

INVENTOR
MARCEL NICOLAS VRANCKEN

BY
WATSON, COLE, GRINDLE & WATSON
ATTORNEYS

United States Patent Office 3,405,265
Patented Oct. 8, 1968

3,405,265
THERMOGRAPHIC COPYING METHOD AND APPARATUS HAVING MEANS FOR UNIFORMLY PRE-HEATING THE COPY SHEET
Marcel Nicolas Vrancken, Hove, Belgium, assignor to Gevaert Photo-Producten N.V., Mortsel, Belgium, a company of Belgium
Filed May 24, 1965, Ser. No. 458,345
Claims priority, application Australia, Dec. 4, 1964, 52,485
14 Claims. (Cl. 250—65)

The present invention relates to a thermographic copying method and apparatus therefor.

In the usual thermographic reproduction systems an image-wise radiation absorbing original to be reproduced is reflectographically infra-red irradiated through the thermographically material in contact with the radiation absorbing image portions of the original thus image-wise conducting heat to the thermosensitive layer and creating therein a laterally reversed image of the original. To obtain a legible image a thermographic material may comprise a transparent support carrying layer which contains the substance that changes colour on heating. For enhancing the optical contrast in such material, the thermosensitive layer is covered with an opaque, mostly white, layer.

In the U.S. patent application Ser. No. 421,861, which is a continuation-in-part application of U.S. patent application 337,664 now abandoned, a reflectographic exposure technique is illustrated by FIG. 11 wherein a heat-sensitive material as described therein is reflectographically exposed to infrared light, which radiation is converted into heat in the dispersed silver particles of a heat-absorbing layer. The heat-sensitive layer adjacent to said heat-absorbing layer becomes hydrophobic and impermeable to water in correspondence with the infrared-reflecting areas of the original. The heat-sensitive layer is shielded from the heat, which could be transferred by conduction from the heat-absorbing image portions of the original by means of a support, which does not conduct heat but which is permeable to infrared radiation.

In accordance with the invention, an original as defined hereinafter is exposed to infrared radiation while an element is present between the radiation source and said original, which element is characterized by the property of absorbing a certain amount of said radiation and converting such radiation into heat, substantially the remainder of the radiation directed at the original being transmitted by the element to the original, wherein the proportions of the radiation which are absorbed and which are transmitted by said element are chosen in such a way that sufficient radiation transmitted by the intervening element can be reflected by the original against the element, the reflected radiation being likewise absorbed by the element and serving to effect an image-wise heating of said element, the element being so prepared as to have applied thereto or incorporated therein substances of such a nature as to absorb infrared radiation and convert it into heat.

The "original," as employed herein, is an original containing image areas or an image background, which reflect infrared radiation or is a transparency, which has infrared absorbing areas and which, during the exposure, is held with its back side in contact or near proximity with an infrared reflecting material.

The infrared absorbing substances may form part of an element which is separate from the thermosensitive material or as a separate layer of the same element carrying the thermosensitive layer.

The heat energy of the heat pattern which results from the reflected electromagnetic energy absorbed in or on such separate element, can be transferred by simple conductance from the surface of said element to a heat-sensitive material or substances e.g. a meltable powder, vaporizable dye or reaction component.

Such separate element coated with and/or containing substances which absorb said radiation and convert it into heat is used as a removable or fixed part of the copying unit. A radiation source is used which emits a substantial part of radiation in the infrared region.

Substances that convert infrared light into heat are among others: carbon black, graphite, oxides or sulphides of heavy metals, particularly of those heavy metals that have an atomic weight comprised between about 45 and about 210 such as e.g. manganese and lead sulphide, as well as these metals themselves in finely divided form such as silver, bismuth, lead, iron, cobalt and nickel. Dark black pigments are favoured.

Said substances are used in dispersed form in a binder which may be a water-insoluble polymer, or a hydrophilic colloid e.g. gelatin and polyvinyl alcohol. The use of infrared absorbing substances in dissolved form is, however, not excluded, e.g. copper (II) sulphate is such a substance which can be used in dissolved state in a hydrophilic colloid.

For obtaining a sufficient image differentiation the amount of radiation emitted in the direction of the original should be transmitted by the said element, preferably for at least 20% and at most 80%. Said element may be rigid as well as flexible, dependent on the nature of the base or binder employed for the infrared radiation absorbing substances.

In order to prevent the creation of a heat-conductive relationship between the radiation-absorptive portions of the original and said element a thin transparent non-heat-conductive element can be placed therebetween during the radiation step.

According to a preferred embodiment, the infrared-absorbing substances are used as a discontinuous coating on an element forming a removable or fixed part of a copying apparatus. The element itself in that embodiment preferably possesses a high transmittance for the applied radiation. The coating has preferably the form of a dotted screen. The dots can be applied at random or according to a geometrical pattern. Such a pattern can have some relief and be formed by printing (e.g. using a carbon black-containing ink), vacuum-coating or screen-wise etching, e.g., when using a heavy metal.

The said coating itself has preferably practically no reflective power for the applied infrared radiation.

The resolving power of the said element depends on the amount of infrared radiation-absorbing dots per square inch.

A preferred pattern is a checkerboard pattern as is used in a photographic contact screen known from photogravure techniques.

The latent heat pattern created in the radiation-absorbing element is placed during or immediately after the exposure in heat-conductive relationship with a heat-sensitive material or substances, e.g., a coloured meltable powder, known in thermography to bring about therein or therewith directly, by transfer or by an after-treatment a visible change in accordance with the said heat pattern. Suitable heat-sensitive materials are e.g. described in United Kingdom patent specifications 985,933 and 863,366, and United States patent application 268,779.

With thermographic materials which become coloured on heating, negative copies of positive originals are produced whereas with thermographic materials which become discoloured on heating such as one described in United Kingdom patent specification 863,366, positive copies of originals are produced.

Methods and means for carrying out the invention will now be described with reference to FIGURES 1, 2, 3 and 4 of the accompanying drawings.

Figure 1:
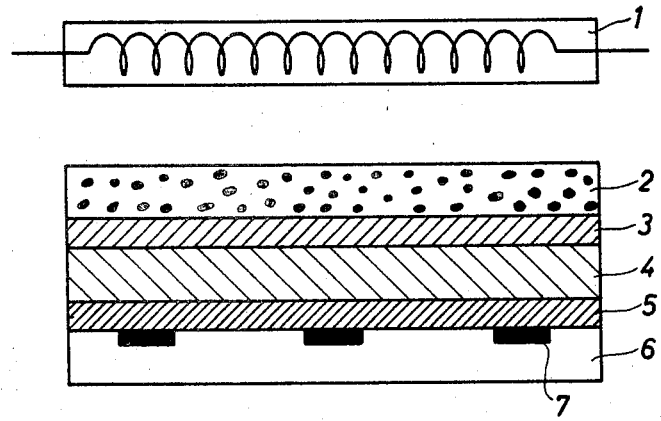
FIGURES 1 and 2 represent schematically arrangements for reflex exposure according to the present invention.

In FIG. 1 element 1 represents an infrared radiation source and element 2 is a self-supporting sheet comprising in a binder infrared absorbing particles to such an extent that at least 20% and at most 80% of the infrared radiation emitted in the direction of the original 6 is absorbed. Element 3 represents a heat-sensitive layer that discolours on heating and element 4 is a thin support therefor. Element 5 is a heat-insulating sheet that transmits infrared radiation and element 6 represents an original that contains infrared absorbing image markings 7 on an infrared reflecting background.

Figure 2:
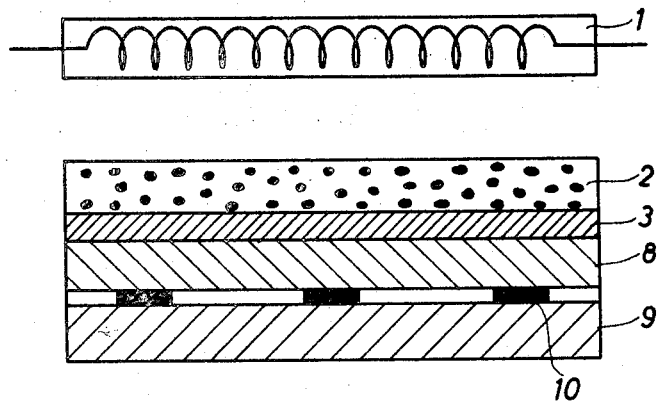

In FIG. 2 element 1 represents an infrared radiation source and element 2 represents a self-supporting sheet comprising incorporated in a binder infrared absorbing substances to such an extent that at least 20% and at most 80% of the infrared radiation emitted in the direction of the original 9 is absorbed. Element 3 represents an infrared transmitting heat-sensitive layer that becomes coloured on heating and element 8 is a heat-insulating infrared transmitting support therefor. Element 9 is a negative silver print 10 of a graphic original on a baryta coated paper support.

Figure 3:
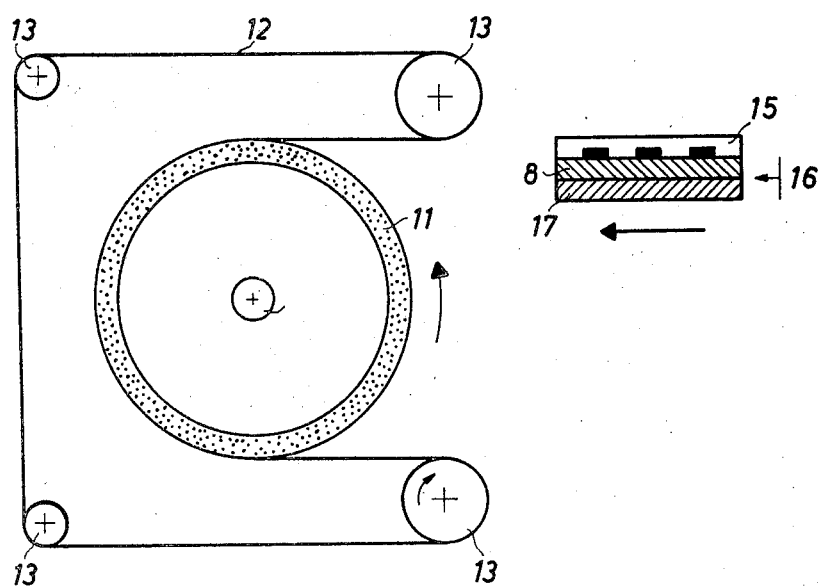
FIGURE 3 represents schematically a thermographic copying apparatus for reflex exposure according to the present invention with an infrared radiation source.

In FIG. 3 element 11 is a rotatable cylinder the wall of which comprises infrared absorbing substances. Element 12 is an endless belt for conveying by means of the conveying rollers 13 a graphic original 15 and a thermosensitive copying material 16 around the infrared lamp 14. The copying material consists of an infrared transmissive heat-insulating support 8 and a heat-sensitive layer 17.

According to a preferred embodiment the apparatus schematically represented by FIG. 3 is modified in that way that the infrared absorbing substances are not dispersed in the wall of the hollow cylinder but applied thereon on the outerside in the form of a checkerboard pattern with black squares of 0.01 sq. mm.

The following example illustrates the present invention without, however, limiting it thereto.

EXAMPLE 1

*(a) Preparation of the thermosensitive material*

A 7% aqueous solution of gelatin is applied to a cellulose triacetate support in such a way that 7 g. of gelatin are present per sq. m. The gelatin layer is dried, whereupon a layer is coated thereon in a proportion of 50 g./sq. m. from the following composition:

| | Ccs. |
|---|---|
| 1% aqueous solution of gelatin | 1000 |
| 40% colloidal aqueous dispersion of polyethylene having a particle size of less than 0.1$\mu$ and an average molecular weight comprised between 15,000 and 30,000 | 75 |

This latter layer is dried below 35° C.

*(b) Recording*

The heat-sensitive recording element obtained is exposed as schematically represented by FIG. 3. The radiation absorptive substances, which in this case are carbon black particles, however, are not present in the wall of the hollow glass cylinder but in a gelatin layer braced thereon. This carbon black-containing gelatin layer has a density of 0.3. The heat-sensitive material, its polyethylene-containing layer being in contact with said gelatin layer, is led together with an original around the infrared radiation source at a speed of 5 cm./second. In the present test, this radiation source has a power of 1000 w. and is situated at a distance of 2 cm. of the heat-sensitive material. The information to be reproduced is a text typed on white paper.

During the exposure the polyethylene-containing layer undergoes a decrease in solubility and permeability for water at the areas corresponding with the light-reflecting areas of the original. By dipping the heat-imaged recording material in an aqeous solution of methylene blue, the areas of the polyethylene-containing layer that remain permeable are coloured blue, so that a positive image of the original is obtained.

EXAMPLE 2

A 7% aqueous solution of gelatin containing per liter 2 g. of an infrared-absorbing colloidal silver solution is applied in a proportion of 7 g. of gelatin per sq. m. to a polyethylene glycol terephthalate support bearing a subbing layer.

After drying, the following composition is coated thereon in a proportion of 50 g./sq. m.:

| | Ml. |
|---|---|
| 1% aqueous solution of gelatin | 1000 |
| 40% colloidal aqueous dispersion of polyethylene having a particle size less than 0.1$\mu$ and an average molecular weight comprised between 15,000 and 30,000 | 75 |

The resulting layer is dried below 35° C.

Figure 4:
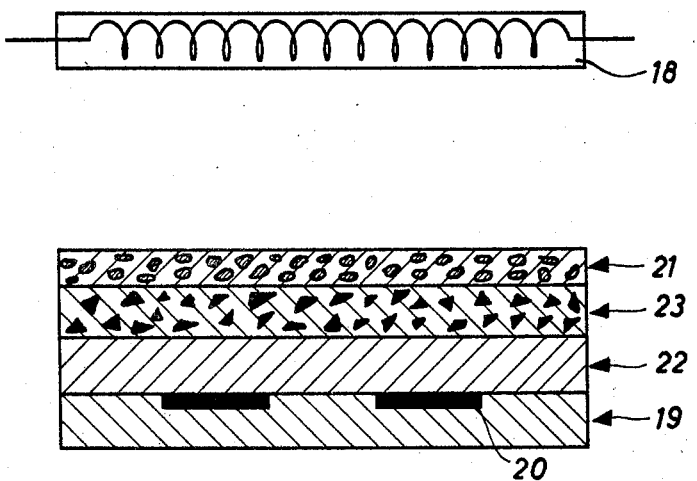

The obtained heat-sensitive recording material is schematically illustrated by FIG. 4. In this figure layer 21 represents the layer containing the heat-sensitive polymer particles, layer 23 is a heat-absorbing layer containing silver particles, layer 22 is a support which does not conduct heat and which is permeable to infrared radiation, whereas the element 19 represents the original comprising infrared-absorbing portions 20 and infrared-reflecting areas, which practically do not conduct heat.

The heat-sensitive recording material is reflecto-graphically exposed to infrared light from a radiation source 18 as illustrated in FIG. 4. The heat-sensitive layer becomes hydrophobic and impermeable to water at the areas corresponding with the areas of the original, reflecting infrared light. By treating the thus irradiated recording element in a silver-bleaching bath, a negative copy of the original is obtained.

What I claim is:

1. A process of thermographic reproduction which comprises the steps of:
   (1) Exposing with infrared radiation an original adapted to reflect said radiation in an imagewise manner;
   (2) Intercepting at least about 20% but not more than about 80% of said radiation by means of an infrared absorbing layer arranged between the radiation source and said original, substantially the remainder of said radiation being transmitted by said layer to said original and substantially reflected from the reflective areas thereof; and
   (3) Arranging in heat-conductive relationship with said absorbing layer a heat-sensitive layer adapted to undergo a change upon exposure to heat,
whereby said absorbing layer is heated uniformly by the radiation directly absorbed thereby and differentially by the radiation reflected imagewise from said original, said heat-sensitive layer being correspondingly heated through conduction from said absorbing layer and acquiring a correspondingly differentiated image therein.

2. A thermographic process according to claim 1, wherein said heat-sensitive layer after the exposure is separated from said infrared-absorptive element which is not firmly associated with said heat-sensitive layer.

3. A thermographic process according to claim 1, wherein the original is a transparency, which during the exposure is held with its back side at least adjacent to an infrared reflecting material.

4. A thermographic process according to claim 1, wherein said element contains on one of its surfaces infrared absorbing substances in the form of a discontinuous coating.

5. A thermographic process according to claim 4, wherein said discontinuous coating has the form of a dotted screen.

6. A thermographic process according to claim 5, wherein the dotted screen has the form of a checkerboard pattern.

7. A thermographic process according to claim 4, wherein said substance is carbon black, a heavy metal or an oxide or sulphide of the latter.

8. Thermographic copying apparatus for carrying out the process of claim 1, which comprises an infrared radiation source, means for supporting an original to be reproduced in exposing relation to said radiation source, and a screening element arranged between said source and said original and adapted to absorb at least about 20% but not more than about 80% of the radiation directed towards said original and transmit substantially the remainder thereof.

9. Thermographic copying apparatus according to claim 8, wherein said element is a coating on a hollow infrared transmissive cylinder, which is rotatably mounted around said infrared radiation source.

10. Thermographic copying apparatus according to claim 8, wherein said element is coated on one of its surfaces with a discontinuous infrared absorbing coating.

11. Thermographic copying apparatus according to claim 10, wherein said coating has the form of a dotted screen.

12. Thermographic copying apparatus according to claim 11, wherein said coating has the form of a checkerboard pattern with black squares of 0.01 sq. mm.

13. Thermographic copying appaartus according to claim 8, wherein said substances are selected from the group consisting of carbon black, heavy metals and oxides and sulphides of the latter.

14. Thermographic copying apparatus according to claim 8 and, containing means for contacting a heat-sensitive material with said element during reflectographic infrared exposure of an original that image-wise reflects infrared light.

References Cited
UNITED STATES PATENTS

| | | | |
|---|---|---|---|
| 2,629,671 | 2/1953 | Murray | 250—65.1 |
| 2,999,035 | 9/1961 | Sahler | 117—36 |
| 3,056,904 | 10/1962 | Kotz et al. | 315—241 |
| 3,074,809 | 1/1963 | Owen | 250—65.1 |
| 3,120,611 | 2/1964 | Lind | 250—65.1 |
| 3,219,819 | 11/1965 | Brewster | 250—65.1 |

RALPH G. NILSON, *Primary Examiner.*

A. L. BIRCH, *Assistant Examiner.*